(12) United States Patent
Lukk

(10) Patent No.: US 10,271,038 B2
(45) Date of Patent: Apr. 23, 2019

(54) CAMERA WITH PLENOPTIC LENS

(71) Applicant: Disney Enterprises, Inc., Burbank, CA (US)

(72) Inventor: Howard Lukk, North Hollywood, CA (US)

(73) Assignee: Disney Enterprise, Inc., Burbank, CA (US)

( * ) Notice: Subject to any disclaimer, the term of this patent is extended or adjusted under 35 U.S.C. 154(b) by 498 days.

(21) Appl. No.: 13/742,230

(22) Filed: Jan. 15, 2013

(65) Prior Publication Data

US 2014/0198187 A1    Jul. 17, 2014

(51) Int. Cl.
*H04N 13/02* (2006.01)
*H04N 13/239* (2018.01)
*H04N 13/243* (2018.01)
*H04N 13/271* (2018.01)

(52) U.S. Cl.
CPC ......... *H04N 13/239* (2018.05); *H04N 13/243* (2018.05); *H04N 13/271* (2018.05)

(58) Field of Classification Search
CPC .................................................. H04N 13/025
USPC ........................................................... 348/49
See application file for complete search history.

(56) References Cited

U.S. PATENT DOCUMENTS

| | | | | |
|---|---|---|---|---|
| 8,279,325 B2 * | 10/2012 | Pitts | ................... | H04N 5/23212 348/345 |
| 8,290,358 B1 * | 10/2012 | Georgiev | ...................... | 396/326 |
| 2011/0075922 A1 * | 3/2011 | Turner | ................. | H04N 13/261 382/164 |
| 2011/0080491 A1 * | 4/2011 | Drazic | ............... | G02B 27/0075 348/222.1 |
| 2014/0168401 A1 * | 6/2014 | De Bruijn | ............... | G06F 3/013 348/78 |

\* cited by examiner

*Primary Examiner* — Gims S Philippe
*Assistant Examiner* — Mainul Hasan
(74) *Attorney, Agent, or Firm* — Patent Ingenuity, P.C.; Samuel K. Simpson

(57) ABSTRACT

An image capture device includes a lens that receives light. Further, the image capture device includes an optical beam splitter that receives the light from the lens. In addition, the image capture device includes an image sensor that receives a first portion of the light from the optical beam splitter. The image capture device also includes a plenoptic lens that receives a second portion of the light from the optical beam splitter.

25 Claims, 7 Drawing Sheets

CAMERA WITH PLENOPTIC LENS

BACKGROUND

1. Field

This disclosure generally relates to the field of image capture systems. More particularly, the disclosure relates to image capture systems that are utilized to capture stereoscopic images.

2. General Background

Stereoscopic images are images that are slightly offset so that the viewing of such images together results in a single image with depth. Content producers capture stereoscopic images with image capture devices, e.g., cameras, to provide a three-dimensional ("3D") viewing experience for the audience of the content. The current cinema graphic configurations typically involve large rigs with heavy and expensive equipment. As a result, capturing image data for 3D content is often cumbersome.

SUMMARY

In one aspect of the disclosure, an image capture device is provided. The image capture device includes a lens that receives light. Further, the image capture device includes an optical beam splitter that receives the light from the lens. In addition, the image capture device includes an image sensor that receives a first portion of the light from the optical beam splitter. The image capture device also includes a plenoptic lens that receives a second portion of the light from the optical beam splitter.

In another aspect of the disclosure, a system is provided. The system includes an image capture device comprising a lens that receives light, an optical beam splitter that receives the light from the lens, an image sensor that receives a first portion of the light from the optical beam splitter, and a plenoptic lens that receives a second portion of the light from the optical beam splitter. Further, the system includes a processor that performs at least one post-production edit on depth data received from the plenoptic lens based upon the second portion of the light.

In yet another aspect of the disclosure, a process is provided. The process receives a portion of light from a plenoptic lens that was split by an optical beam splitter. Further, the process performs at least one post-production edit on depth data received from the plenoptic lens based upon the portion of the light.

In one aspect of the disclosure, a computer program product is provided. The computer program product includes a computer readable medium having a computer readable program stored thereon. The computer readable program when executed on a computer causes the computer to receive a portion of light from a plenoptic lens that was split by an optical beam splitter. Further, the computer readable program when executed on the computer causes the computer to perform at least one post-production edit on depth data received from the plenoptic lens based upon the portion of the light.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 2A illustrates the focus element positioned within the lens in front of the optical beam splitter.

FIG. 2B illustrates the focus element positioned in between the optical beam splitter and the first image sensor.

DETAILED DESCRIPTION

An image capture device, e.g., a digital motion picture camera, may be utilized to obtain depth information. Such depth information may be utilized during post production to isolate images in a particular scene. Various edits may then be performed on such images. For example, a particular image may be deleted from the scene. Further, an image may also be inserted into a particular scene at a given depth.

Such depth information allows for efficient editing in contrast with current configurations that involve utilizing various colored screens, e.g., a green screen or a blue screen, in the image capture of the scene and performing edits to objects based upon the positioning of the objects in relation to such screens. The green screen and blue screen configurations involve the overlay of two image layers, i.e., an image layer with a green screen or a blue screen overlaying another image layer. The green or blue color in the first screen becomes a transparent layer through which the underlying image layer may be viewed. As an example, a meteorologist may stand in front of a green screen. That image layer may overlay a weather map. The portions of the green screen in front of which the meteorologist is not standing become transparent so that the map is viewed. Such configurations involve the cumbersome process of utilizing colored screens. Further, utilizing the depth information from the plenoptic lens avoids having colored borders appear around the objects in the image as a result of utilizing the colored screens.

The image capture device is a lightweight alternative to current rigging equipment that is often cumbersome to move and utilize in a production environment. Content directors may utilize the image capture device to easily move around an area of image capture.

The image capture device is not limited to a digital motion picture camera. For example, the image capture device may be a video camera, still image camera, or the like.

Figure 1:
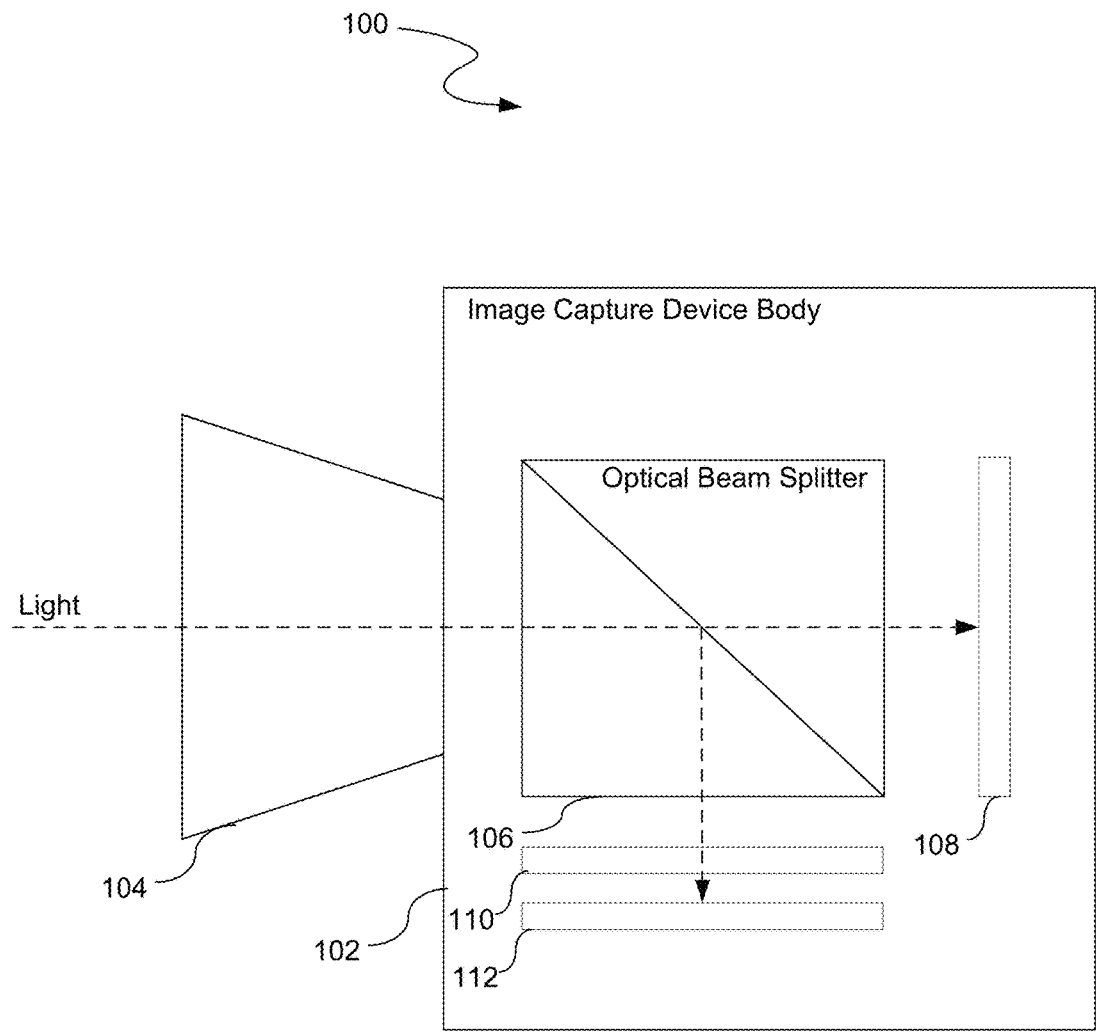
FIG. 1 illustrates an image capture device.

FIG. 1 illustrates an image capture device 100. The image capture device 100 includes an image capture body 102 and a lens 104. Light enters the image capture device 100 through the lens 104. The light then passes through the lens 104 to an optical beam splitter 106. The optical beam splitter 106 splits the light such that a first portion of the light travels to a first image sensor 108 and a second portion of the light travels to a plenoptic lens 110. The plenoptic lens 110 includes an array of micro lenses, i.e., lenses that have small diameters that may be less than ten millimeters. The plenoptic lens 110 allows for the capture of high quality depth information of an image.

The second portion of the light then travels through the plenoptic lens 110 to a second image sensor 112. The image sensors convert the respective portions of the light into electrical signals corresponding to image data. The image sensors may be standard or high resolution image sensors. Further, a plurality of image sensors may be utilized for either or both of the first image sensor 108 and/or the second image sensor 112. As an example, a plurality of image sensors may be utilized in place of the second image sensor 112 such that the plurality of image sensors are aligned with the micro lenses of the plenoptic lens 110.

Figure 2A:
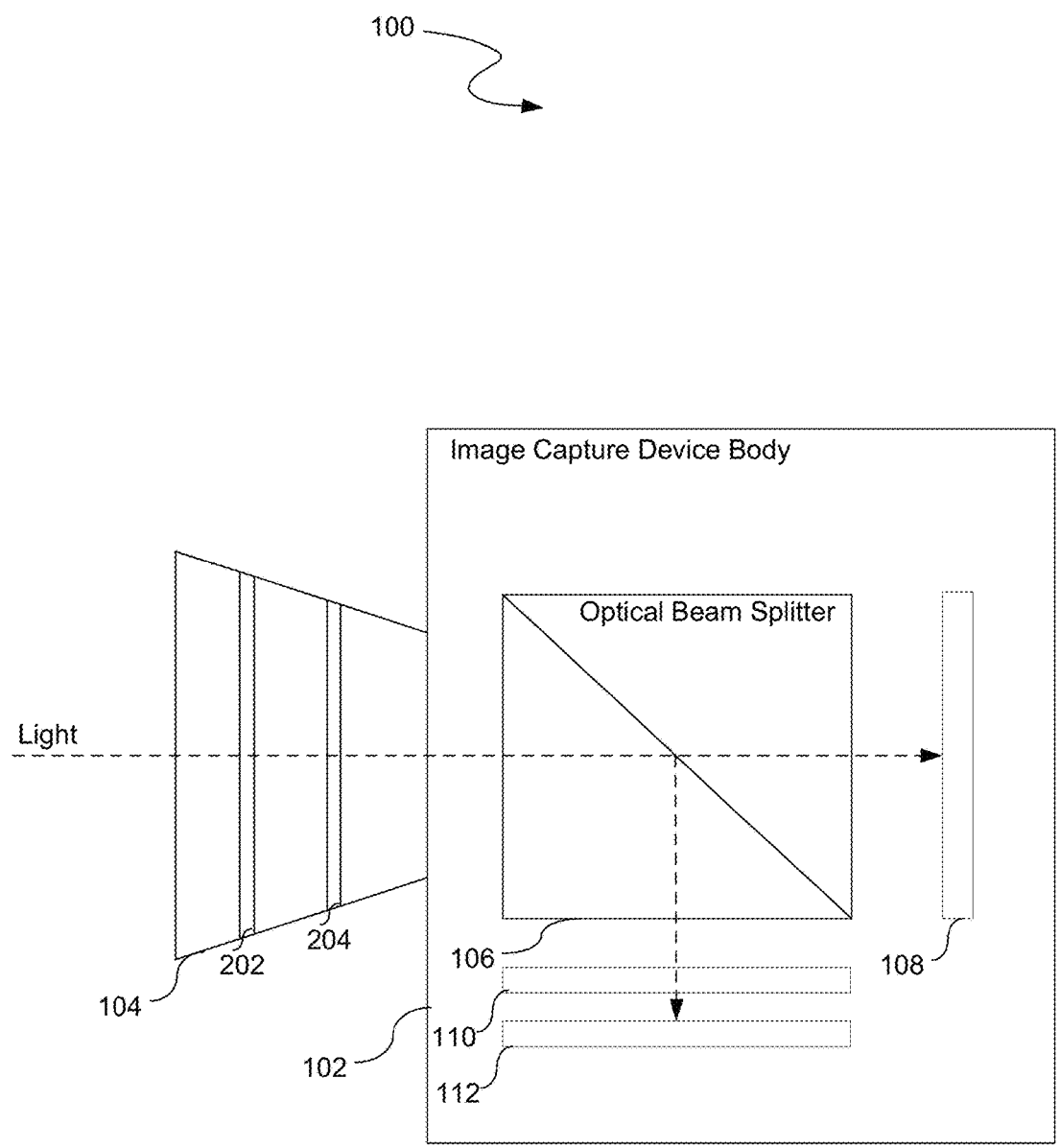
FIGS. 2A and 2B illustrate various configurations in which a focus element may be positioned within the image capture device illustrated in FIG. 1.
Figure 2B:
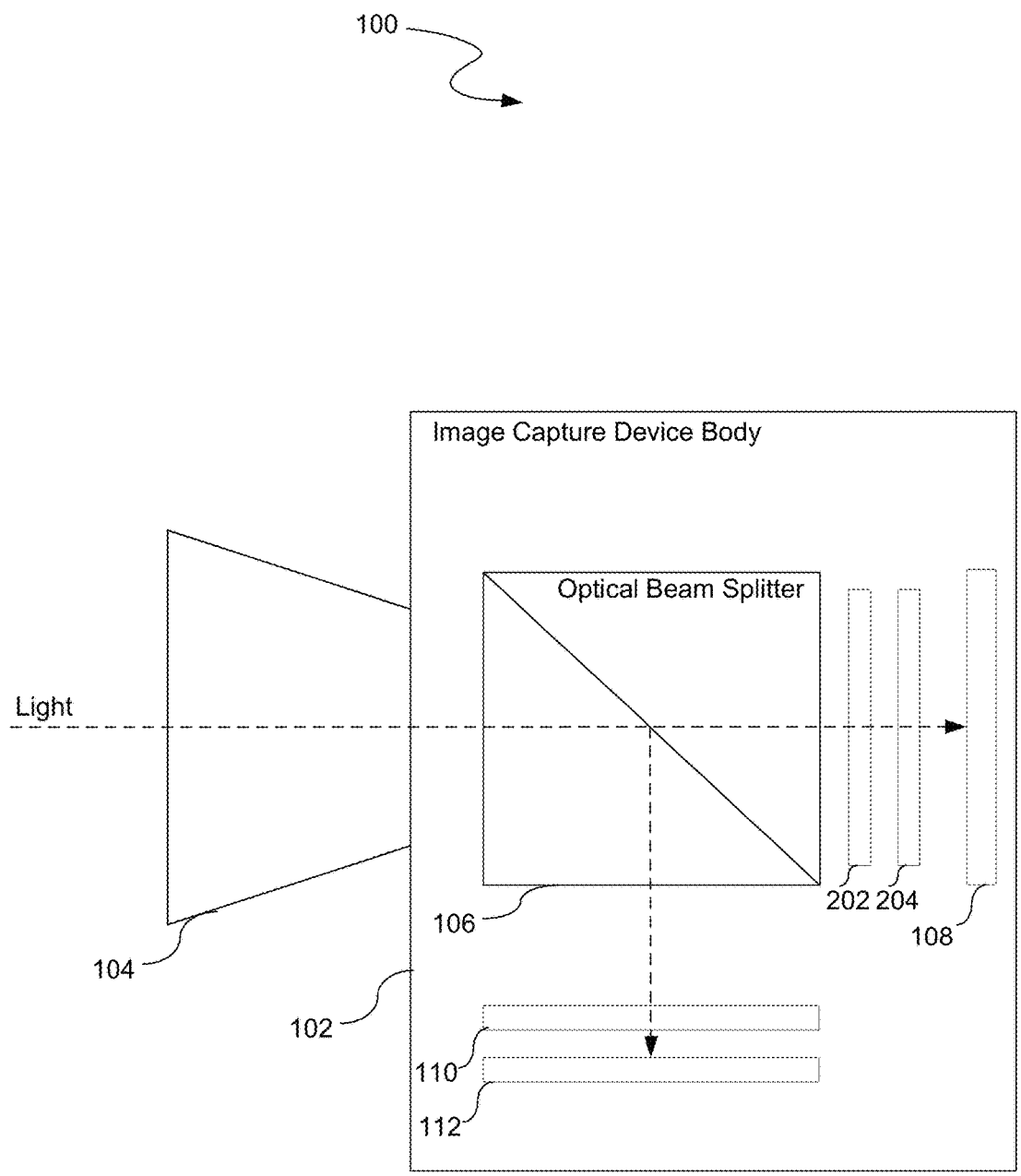

FIGS. 2A and 2B illustrate various configurations in which a focus element 202 may be positioned within the image capture device 100 illustrated in FIG. 1. FIG. 2A illustrates the focus element 202 positioned within the lens 104 in front of the optical beam splitter 106. The lens 104 also has an iris diaphragm 204. By adjusting the iris diaphragm 204, the size of an aperture in the lens 104 may be changed to vary the amount of light that passes through the lens 104. Accordingly, the focus element 202 focuses the light passing through the lens 104 prior to the light entering the optical beam splitter 106. Although the focus element 202 is illustrated as being within the lens 104, the focus element 202 may alternatively be positioned within the image capture device body 102.

FIG. 2B illustrates the focus element 202 and the iris diaphragm 204 positioned in between the optical beam splitter 106 and the first image sensor 108. As a result, the second portion of the light that is received by the plenoptic lens 110 is unfocused. Accordingly, the plenoptic lens 110 in FIG. 2B effectively becomes a synthetic aperture. The second portion of the light passes through the synthetic aperture, i.e., the plenoptic lens 110, to reach the second image sensor 112. In one aspect, a synthetic aperture is calculated during a post-production editing process. As an example, a processor may be utilized to calculate the synthetic aperture.

The image capture device 100 illustrated in FIG. 1 may be utilized to provide depth data for editing of content. As an example, the depth data may be provided for real time editing of the captured content. As yet another example, the depth data may be provided for post-production editing of the captured content.

The image capture device 100 may be utilized to capture data for various post-production workflows. Examples of such workflows and post-production systems are described in U.S. patent application Ser. No. 13/423,058, which is hereby incorporated by reference in its entirety.

Figure 3:
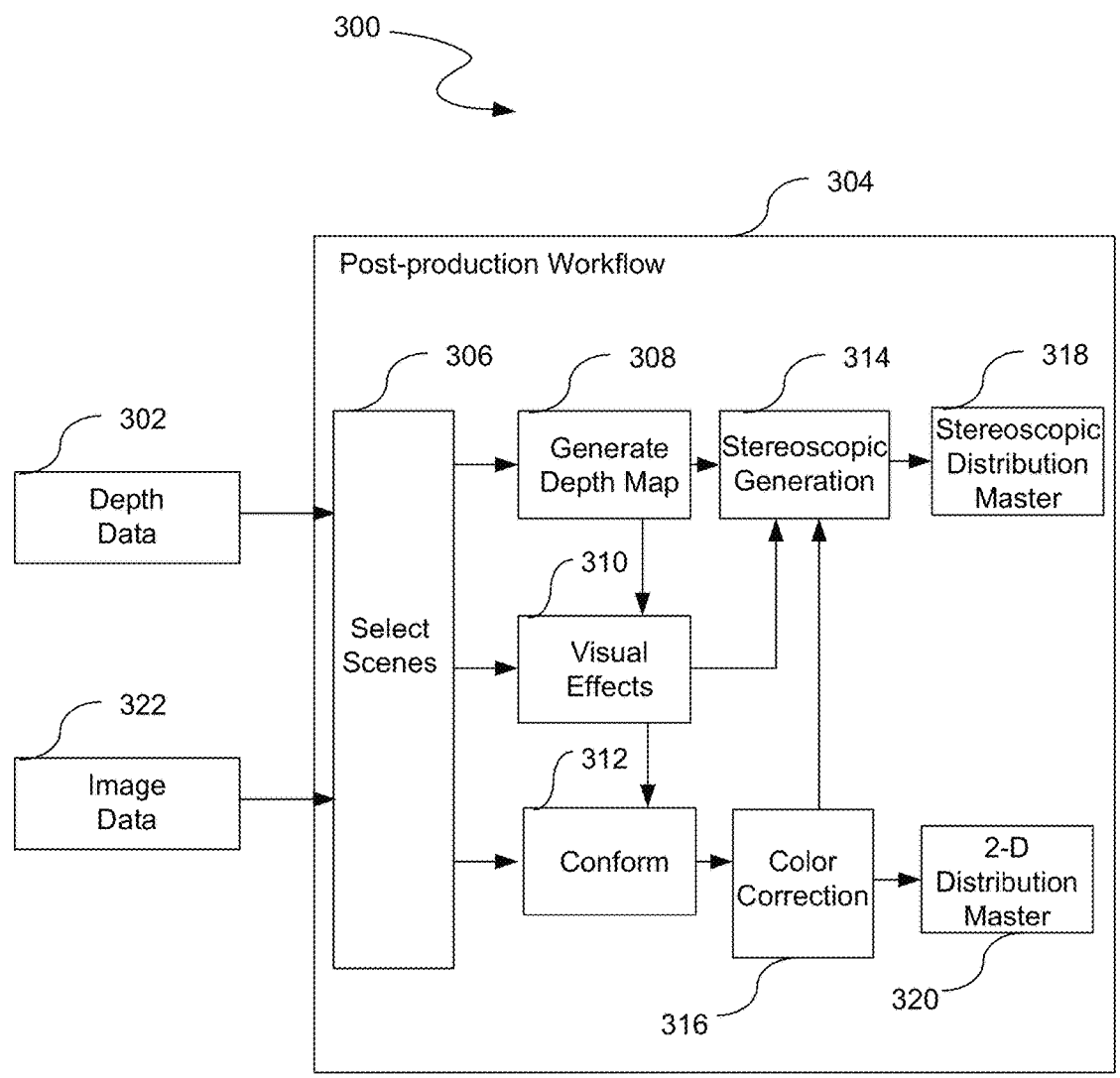
FIG. 3 illustrates an image capture and production workflow.

The image capture device 100 may be operably connected to, may be in operable communication with, or may comprise a system that allows real time and/or post-production editing of the depth data. FIG. 3 illustrates an image capture and production workflow 300. The image capture and production system workflow 300 includes depth data 302 and image data 322 from the image capture device 100 that are provided to a post-production workflow 304. As shown in FIG. 3, the post-production workflow 304 for two dimensional ("2-D") motion pictures, i.e., conventional motion picture images, includes selecting scenes 306, conforming based on the selected scenes 312, adding visual effects 310, color correction 316, and generating a 2D master 320. After a picture is locked so that no further scene selection is desired, a conform 312, i.e., assembly of the motion picture images according to the edit decision list, and a color correction 316 may be performed to prepare the final conformed motion picture for distribution.

The post-production workflow 304 for stereoscopic, i.e., 3D motion pictures includes selecting scenes 306, generating a depth map 308, adding visual effects 310, generating stereoscopic images 314, and generating a stereoscopic distribution master 318. Similar to 2-D post-production scene selection, selecting scenes 306 includes viewing and editing the motion picture data until the picture is locked. In one aspect, the selected depth maps generated 308 may be configured to assist in the generation of visual effects 310.

Figure 4:
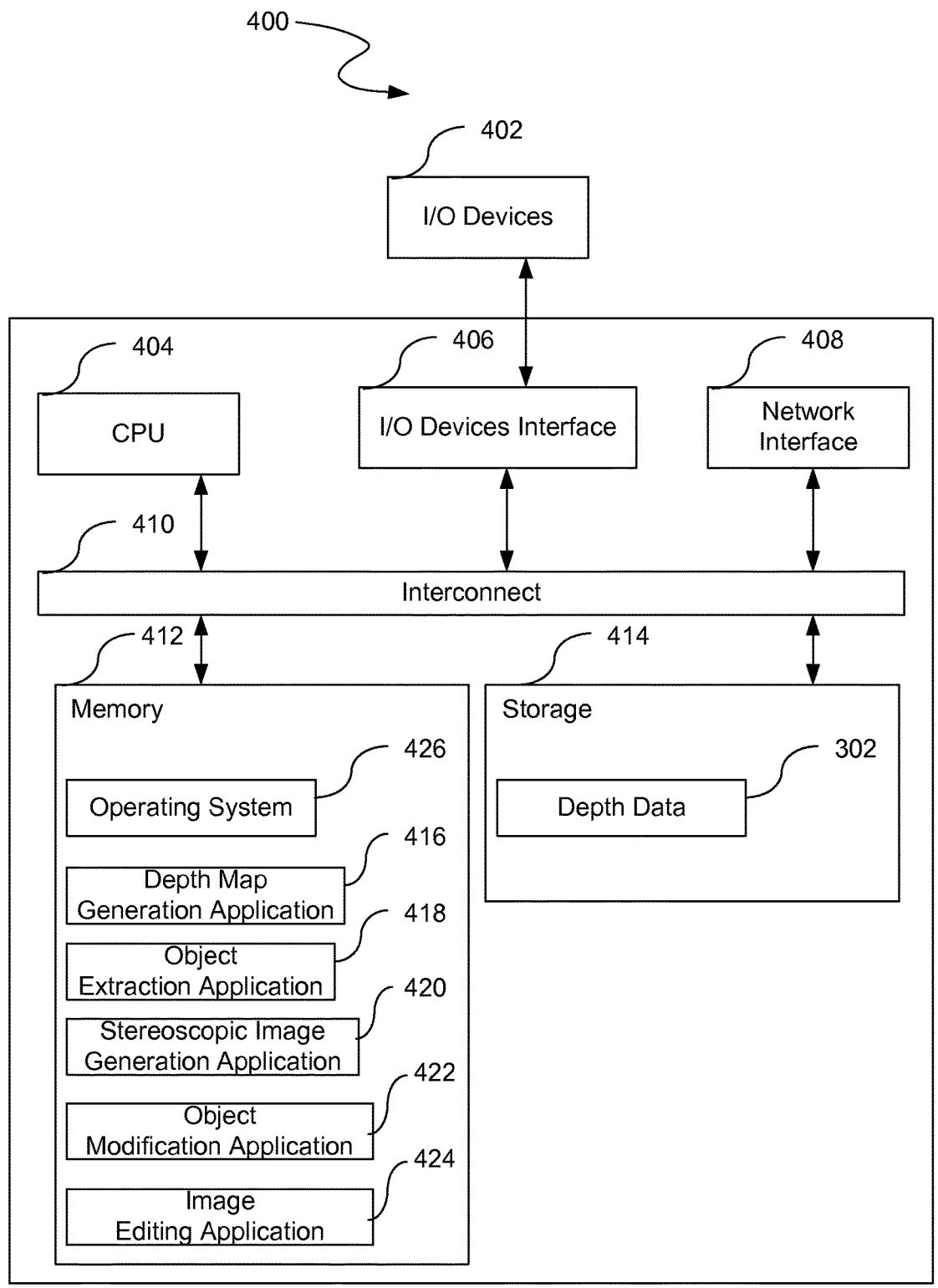
FIG. 4 illustrates an example system that may be utilized to implement the image capture and production workflow illustrated in FIG. 3.

FIG. 4 illustrates an example system 400 that may be utilized to implement the image capture and production workflow 300 illustrated in FIG. 3. As shown, the system 400 includes, without limitation, input/output ("I/O") devices 402, a central processing unit ("CPU") 404, an I/O Devices Interface 406, a network interface 408, an interconnect 410, a memory 412, and a storage 414. The I/O Devices Interface 406 connects I/O devices 402, e.g., keyboard, display, and mouse devices to the system 400.

The CPU 404 retrieves and executes programming instructions stored in the memory 412. Similarly, the CPU 404 stores and retrieves application data residing in the storage 414. The interconnect 410, e.g., bus, facilitates transmission, such as of programming instructions and application data, between the CPU 404, the I/O device interface 406, the storage 414, the network interface 408, and the memory 412. The CPU 404 is included to be representative of a single CPU, multiple CPUs, a single CPU having multiple processing cores, or the like. The memory 412 is generally included to be representative of a random access memory.

The storage 414 may be a disk drive storage device. Although shown as a single unit, the storage 414 may be a combination of fixed and/or removable storage devices, such as fixed disc drives, solid state devices, removable memory cards or optical storage, network attached storage, or a storage area-network, etc. As shown, the storage 414 includes the depth data 302 illustrated in FIG. 3. The storage 414 may include other data such as data captured by the first image sensor 108 illustrated in FIG. 1.

The system 400 is included to be representative of a physical computing system as well as virtual machine instances hosted on a set of underlying physical computing systems. Although shown as a single computing system, one of ordinary skill in the art will recognize that the components of the system 400 illustrated in FIG. 4 may be distributed across multiple computing systems connected by a data communications network.

As shown, the memory 412 includes an operating system 426 and applications. The applications include a depth map generation application 416 configured to generate depth maps based on images captured by the image capture device 100 illustrated in FIG. 1. The applications further include an object extraction application 418 configured to extract objects of an image onto separate layers based on a depth map corresponding to the image. For example, objects may be extracted based on edge and color data, as described above.

The applications further include a stereoscopic image generation application 420 configured to generate left-eye and right-eye images based on an image and a depth map. For example, the stereoscopic image generation application 420 may employ a mathematical transformation to displace pixels of a primary image and thereby generate left-eye and right-eye images. Further, the stereoscopic image generation application 420 may perform hole filling using data from one or more secondary images. In alternative aspects, the stereoscopic image generation application 420 may be configured to generate a plurality of images such as n images for auto-stereoscopic images. For example, the stereoscopic image generation application 420 may generate nine or twenty seven different images that, when composited and viewed, create a 3D depth effect that does not require the use of special glasses. In addition, an object modification application 422 is configured to permit a user to modify the appearance of the object in an image and/or an associated depth map. Modifying the appearance of the object in an image and/or an associated depth map causes the final stereoscopic motion picture produced from the image and the associated depth map to be altered accordingly. Finally, applications an image editing application 424 permits the user to edit motion picture data captured via the image capture device 100 illustrated in FIG. 1. The image editing application 424 may be utilized to edit, e.g., trim, split, cut, splice, or the like, image sequences captured by the image capture device 100 illustrated in FIG. 1.

Figure 5:
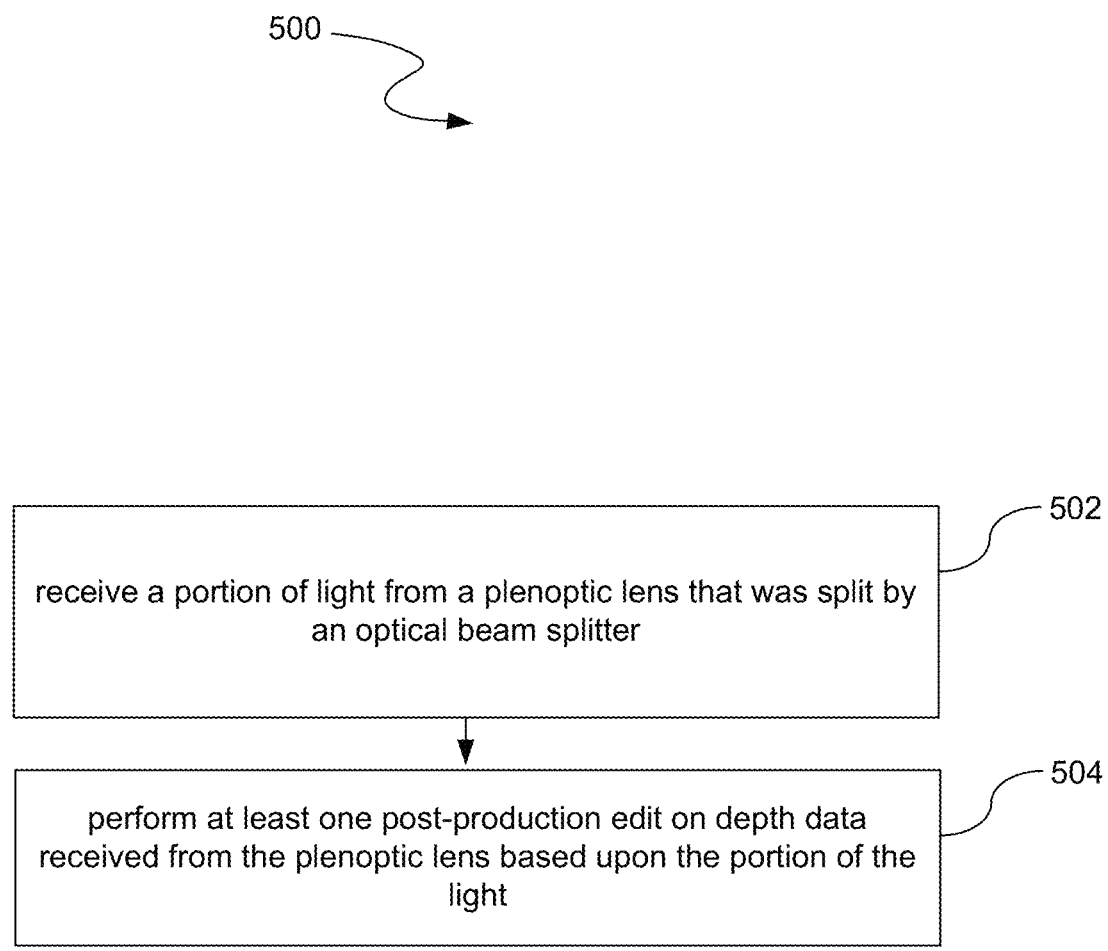
FIG. 5 illustrates a process that is utilized to provide post-production processing for the post-production workflow illustrated in FIG. 3 based on depth data.

FIG. 5 illustrates a process 500 that is utilized to provide post-production processing for the post-production workflow 304 illustrated in FIG. 3 based on depth data. At a process block 502, the process 500 receives a portion of light from a plenoptic lens that was split by an optical beam splitter. Further, at a process block 504, the process 500 performs at least one post-production edit on depth data received from the plenoptic lens based upon the portion of the light.

Figure 6:
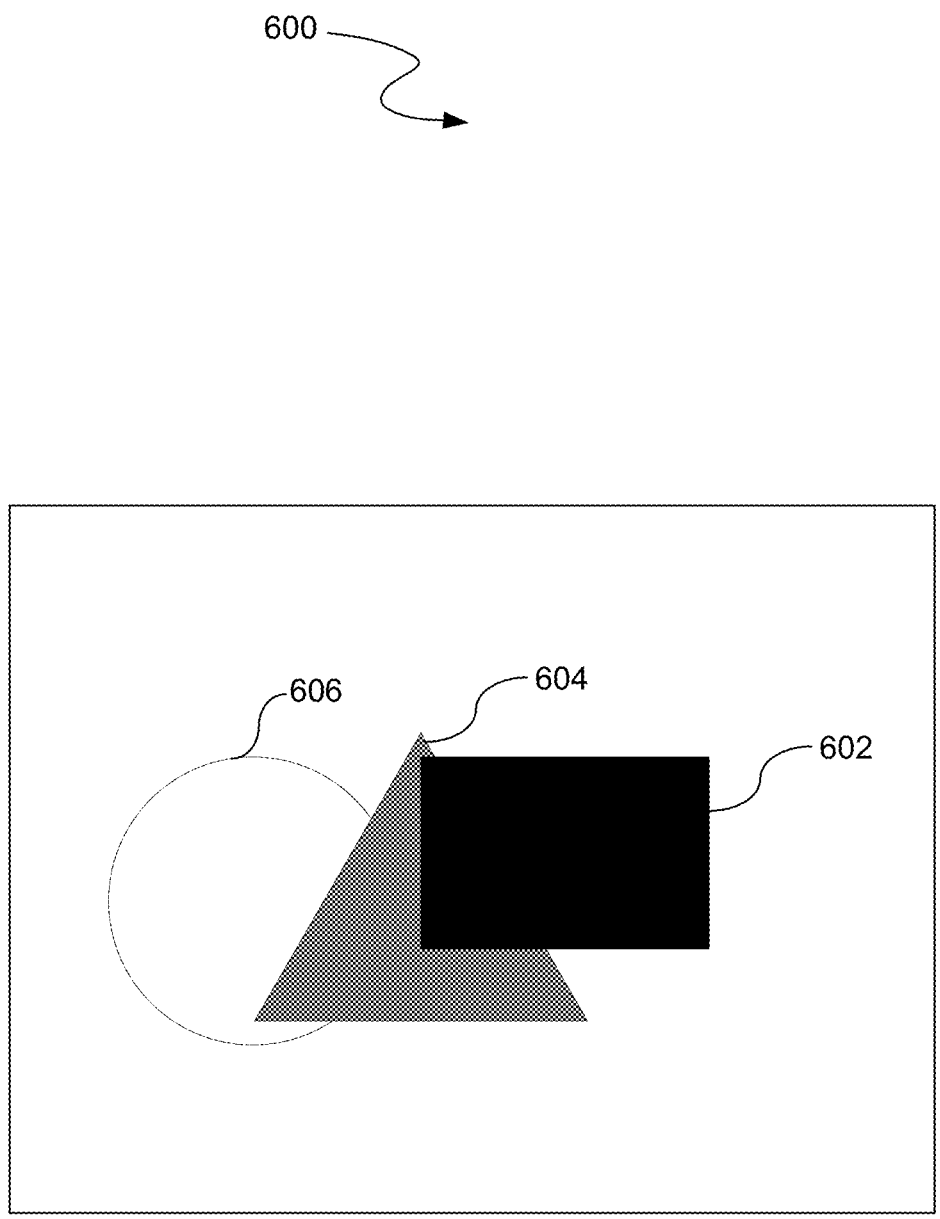
FIG. 6 illustrates a sample depth map that may be generated by the depth map generation application based upon the depth data as illustrated in FIG. 4.

FIG. 6 illustrates a sample depth map 600 that may be generated by the depth map generation application 416 based upon the depth data 302 as illustrated in FIG. 4. The depth map 600 has different shadings based upon the depth of objects within an image. As an example, darker colors may be utilized to indicate objects that are in the foreground whereas lighter colors may be utilized to indicate objects that are in the background. For instance, a rectangle 602 may be at the foreground and have a darker color than a triangle 604 that is in the middle. Further, a circle 606 may have the lightest color as the circle 606 is in the background.

The depth map 600 may be utilized to perform editing operations on objects within an image. For example, the circle 606 may be deleted from the image based upon the depth shading. Further, a new object may be inserted at a particular depth within the image. Accordingly, objects may be automatically isolated by depth in contrast with previous approaches that typically involved manual determinations of depth. By automatically determining the depth of various objects within an image, green screens and blue screens are no longer necessary. As a result, a more lightweight and less expensive apparatus may be utilized in conjunction with a post-production system. The apparatus captures the image data and the depth data, which are then provided to the post-production system for post-production editing.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. An image capture device comprising:
   a lens that receives light;
   an optical beam splitter that receives the light from the lens;
   a focus element that is positioned such that the light is received by the optical beam splitter before passing through the focus element;
   a first image sensor that receives a first portion of the light from the optical beam splitter through the focus element, converts the first portion of the light into a first plurality of electrical signals corresponding to image data, and sends the image data to a processor;
   a plenoptic lens that is a synthetic aperture and that receives a second portion of the light from the optical beam splitter without passing through the focus element; and
   a second image sensor that receives the second portion of the light from the plenoptic lens, converts the second portion of the light into a second plurality of electrical signals corresponding to depth data and a plurality of color shades corresponding to the depth data, and sends the depth data and the plurality of color shades to the processor such that the processor automatically isolates an object in an image corresponding to the image data based upon the depth data and one of the color shades, deletes the object within the image without deleting the image, and generates a stereoscopic distribution master without extraction of data from a two-dimensional distribution master.

2. The image capture device of claim 1, further comprising a high dynamic range element.

3. The image capture device of claim 1, wherein the image sensor is a high resolution image sensor.

4. The image capture device of claim 1, wherein the plenoptic lens is a depth capture sensor.

5. The image capture device of claim 1, wherein the plenoptic lens is a high resolution sensor.

6. A system comprising:
   an image capture device comprising a lens that receives light, an optical beam splitter that receives the light from the lens, a focus element that is positioned such that the light is received by the optical beam splitter before passing through the focus element, a first image sensor that receives a first portion of the light from the optical beam splitter through the focus element, a plenoptic lens that is a synthetic aperture and that receives a second portion of the light from the optical beam splitter, a second image sensor that receives the second portion of the light from the plenoptic lens without passing through the focus element; and a processor that performs at least one post-production edit on depth data corresponding to image data received from the second image sensor based upon the second portion of the light and generates a stereoscopic distribution master without extraction of data from a two-dimensional distribution master, the at least one post-production edit comprising a deletion of an object within an image corresponding to the image data based upon the depth data and a plurality of corresponding color shades without deleting the image.

7. The system of claim 6, wherein the processor performs the at least one post-production edit in real time.

8. The system of claim 6, wherein the processor performs the at least one post-production edit during post production.

9. The system of claim 6, wherein the at least one post-production edit comprises an insertion of image data from the depth data based upon a depth position of the image data within the depth data.

10. The system of claim 6, wherein the at least one post-production edit comprises a removal of image data from the depth data based upon a depth position of the image data within the depth data.

11. The system of claim 6, wherein the synthetic aperture is calculated during a post-production editing process.

12. The system of claim 6, wherein the image capture device further comprises a high dynamic range element.

13. The system of claim 6, wherein the image sensor is a high resolution image sensor.

14. The system of claim 6, wherein the plenoptic lens is a depth capture sensor.

15. The system of claim 6, wherein the plenoptic lens is a high resolution sensor.

16. A method comprising:

receiving, from a first image sensor, a first plurality of electrical signals corresponding to image data that were converted from a first portion of light that was received from an optical beam splitter through a focus element;

receiving, from a second image sensor, a second plurality of electrical signals corresponding to depth data that were converted from a second portion of the light that was received through a plenoptic lens from the optical beam splitter without passing through the focus element, the plenoptic lens being a synthetic aperture;

performing at least one post-production edit of at least one object in the image data based upon the depth data, the at least one post-production edit comprising a deletion of an object within an image corresponding to the image data based upon the depth data and a plurality of corresponding color shades without deleting the image; and generating a stereoscopic distribution master without extraction of data from a two-dimensional distribution master.

17. The method of claim 16, wherein the at least one post-production edit is performed in real time.

18. The method of claim 16, wherein the at least one post-production edit is performed during post production.

19. The method of claim 16, wherein the at least one post-production edit comprises an insertion of image data from the depth data based upon a depth position of the image data within the depth data.

20. The method of claim 16, wherein the at least one post-production edit comprises a removal of image data from the depth data based upon a depth position of the image data within the depth data.

21. A computer program product comprising a non-transitory computer readable storage device having a computer readable program stored thereon, wherein the computer readable program when executed on a computer causes the computer to:

receive, from a first image sensor, a first plurality of electrical signals corresponding to image data that were converted from a first portion of light that was received from an optical beam splitter through a focus element;

receive, from a second image sensor, a second plurality of electrical signals corresponding to depth data that were converted from a second portion of light that was received through a plenoptic lens from the optical beam splitter without passing through the focus element, the plenoptic lens being a synthetic aperture;

perform at least one post-production edit of at least one object in the image data based upon the depth data, the at least one post-production edit comprising a deletion of an object within an image corresponding to the image data based upon the depth data and a plurality of corresponding color shades without deleting the image; and generate a stereoscopic distribution master without extraction of data from a two-dimensional distribution master.

22. The computer program product of claim 21, wherein the at least one post-production edit is performed in real time.

23. The computer program product of claim 21, wherein the at least one post-production edit is performed during post production.

24. The computer program product of claim 21, wherein the at least one post-production edit comprises an insertion of image data from the depth data based upon a depth position of the image data within the depth data.

25. The computer program product of claim 21, wherein the at least one post-production edit comprises a removal of image data from the depth data based upon a depth position of the image data within the depth data.

* * * * *